United States Patent [19]
Penrod et al.

[11] Patent Number: 5,788,341
[45] Date of Patent: Aug. 4, 1998

[54] VEHICLE BRAKE

[75] Inventors: James P. Penrod, Ft. Thomas, Ky.;
Deno J. Rogakos, Centerville, Ohio

[73] Assignee: ITT Automotive Electrical Systems, Inc., Auburn Hills, Mich.

[21] Appl. No.: 468,440

[22] Filed: Jun. 6, 1995

[51] Int. Cl.$^6$ .................................................. B60T 8/32
[52] U.S. Cl. ...................... 303/115.2; 188/156; 188/162; 303/3
[58] Field of Search ...................... 303/113.5, 186, 303/155, 187, 188, 10–12, 116.1–116.4, 170, 115.2, 162, DIG. 3, DIG. 4, 112, 3, 89; 188/181 T, 162, 156, 158, 349, 72.1, 265, 353

[56] References Cited

U.S. PATENT DOCUMENTS

| | | | |
|---|---|---|---|
| Re. 34,667 | 7/1994 | Neumann | 310/216 |
| 2,975,649 | 3/1961 | Propst | 74/424.8 |
| 3,068,713 | 12/1962 | Davis | 74/424.8 |
| 3,068,714 | 12/1962 | Davis | 74/459 |
| 3,302,477 | 2/1967 | Grabowski | 74/424.8 |
| 3,333,484 | 8/1967 | Young | 74/424.8 |
| 3,476,966 | 11/1969 | Willyoung | 310/270 |
| 3,764,182 | 10/1973 | Andreyko et al. | 303/186 |
| 3,790,225 | 2/1974 | Wehde | 188/162 |
| 3,825,308 | 7/1974 | Kasselmann et al. | 303/186 |
| 3,827,758 | 8/1974 | Hansen | 188/156 |
| 3,855,486 | 12/1974 | Binder et al. | 310/49 |
| 3,937,097 | 2/1976 | Fund et al. | 74/424.8 |
| 4,057,301 | 11/1977 | Foster | 303/2 |
| 4,258,584 | 3/1981 | Haegele et al. | 74/424.8 |
| 4,312,544 | 1/1982 | Cochran | 303/186 |
| 4,327,414 | 4/1982 | Klein | 364/426 |
| 4,400,639 | 8/1983 | Kobayashi et al. | 310/215 |
| 4,435,021 | 3/1984 | Hoenick | 303/DIG. 3 |
| 4,458,791 | 7/1984 | Schneider et al. | 188/170 |
| 4,714,299 | 12/1987 | Takata et al. | 303/113.5 |
| 4,722,575 | 2/1988 | Graham | 188/170 |
| 4,756,391 | 7/1988 | Agarwal et al. | 303/162 |
| 4,760,529 | 7/1988 | Takata et al. | 364/426 |
| 4,780,632 | 10/1988 | Murray, III | 310/111 |
| 4,812,723 | 3/1989 | Shimizu | 303/115.2 |
| 4,823,032 | 4/1989 | Ward et al. | 310/43 |
| 4,824,185 | 4/1989 | Leiber et al. | 303/113.5 |
| 4,826,255 | 5/1989 | Volz | 303/10 |
| 4,835,695 | 5/1989 | Walenty et al. | 303/162 |
| 4,839,552 | 6/1989 | Takaba | 310/268 |
| 4,850,650 | 7/1989 | Eckert et al. | 303/186 |
| 4,868,436 | 9/1989 | Attilio et al. | 310/67 R |
| 4,887,480 | 12/1989 | Pollo | 74/459 |
| 4,922,121 | 5/1990 | Taft | 303/115.2 |
| 4,927,212 | 5/1990 | Harrison et al. | 303/115.2 |
| 4,934,761 | 6/1990 | Sauvageot et al. | 188/162 |
| 4,950,028 | 8/1990 | Harrison | 188/162 |
| 4,972,113 | 11/1990 | Newberg | 310/217 |
| 5,006,747 | 4/1991 | Stewart, Sr. | 310/239 |
| 5,008,572 | 4/1991 | Marshall et al. | 310/45 |
| 5,010,266 | 4/1991 | Uchida | 310/156 |
| 5,029,950 | 7/1991 | Vennemeyer et al. | 303/162 |

(List continued on next page.)

FOREIGN PATENT DOCUMENTS

| | | |
|---|---|---|
| 0292648 | 11/1988 | European Pat. Off. |
| 2208936 | 9/1973 | Germany |
| 3342552 | 6/1985 | Germany |
| 3424912 | 1/1986 | Germany |
| 3518715 | 11/1986 | Germany |
| 2283067 | 4/1995 | United Kingdom |

*Primary Examiner*—Douglas C. Butler
*Attorney, Agent, or Firm*—Thomas N. Twomey; J. Gordon Lewis

[57] ABSTRACT

The invention concerns braking systems for vehicles. The invention provides one, or more, electrically actuated pressure generators, which provide hydraulic pressure for actuating hydraulic brakes. Electric actuation allows control by electronic signals, which are generated by a microprocessor-based controller. The pressure generators can be retro-fitted to existing hydraulic brake cylinders. The controller may be incorporated into, or operate in conjunction with, the on-board engine computer.

18 Claims, 9 Drawing Sheets

U.S. PATENT DOCUMENTS

| | | | |
|---|---|---|---|
| 5,049,771 | 9/1991 | Challita et al. | 310/219 |
| 5,068,556 | 11/1991 | Lykes et al. | 310/90 |
| 5,068,557 | 11/1991 | Murugan | 310/90 |
| 5,087,847 | 2/1992 | Giesbert et al. | 310/90 |
| 5,088,362 | 2/1992 | Schalles | 82/142 |
| 5,113,114 | 5/1992 | Shih et al. | 310/270 |
| 5,128,571 | 7/1992 | Itsu | 310/67 R |
| 5,150,951 | 9/1992 | Leiber et al. | 303/113.5 |
| 5,152,588 | 10/1992 | Bright et al. | 188/162 |
| 5,163,743 | 11/1992 | Leppek et al. | 303/155 |
| 5,180,211 | 1/1993 | Weise et al. | 303/113.5 |
| 5,184,877 | 2/1993 | Miyakawa | 188/162 |
| 5,201,573 | 4/1993 | Leiber et al. | 303/113.4 |
| 5,203,616 | 4/1993 | Johnson | 188/170 |
| 5,205,620 | 4/1993 | Dammeyer et al. | 303/155 |
| 5,234,262 | 8/1993 | Walenty et al. | 303/155 |
| 5,234,263 | 8/1993 | Haerr et al. | 303/115.2 |
| 5,236,257 | 8/1993 | Monzaki et al. | 303/115.2 |
| 5,255,962 | 10/1993 | Neuhaus et al. | 303/188 |
| 5,275,474 | 1/1994 | Chin et al. | 303/162 |
| 5,277,481 | 1/1994 | Weise et al. | 303/113.5 |
| 5,296,773 | 3/1994 | El-Antably et al. | 310/261 |
| 5,297,856 | 3/1994 | Asano | 303/9.61 |
| 5,302,008 | 4/1994 | Miyake et al. | 188/162 |
| 5,321,328 | 6/1994 | Ide | 310/90 |
| 5,348,123 | 9/1994 | Takahashi et al. | 188/162 |
| 5,357,160 | 10/1994 | Kaneda et al. | 310/67 R |
| 5,370,449 | 12/1994 | Edelen et al. | 188/170 |
| 5,378,055 | 1/1995 | Maas et al. | 303/113.1 |
| 5,383,718 | 1/1995 | Burgdorf et al. | 303/113.2 |
| 5,385,395 | 1/1995 | Volz | 303/116.1 |
| 5,386,893 | 2/1995 | Feigel | 188/299 |
| 5,388,482 | 2/1995 | Jones et al. | 74/602 |
| 5,388,899 | 2/1995 | Volz et al. | 303/119.2 |
| 5,394,043 | 2/1995 | Hsia | 310/90 |
| 5,398,370 | 3/1995 | Gorner et al. | 15/250 |
| 5,399,000 | 3/1995 | Aoki et al. | 188/156 |
| 5,400,877 | 3/1995 | Kircher et al. | 188/299 |
| 5,400,882 | 3/1995 | Weiler et al. | 188/325 |
| 5,401,084 | 3/1995 | Volz | 303/113.2 |
| 5,401,085 | 3/1995 | Burgdorf et al. | 303/115.1 |
| 5,401,087 | 3/1995 | Goossens | 303/119.2 |
| 5,403,077 | 4/1995 | Burgdorf et al. | 303/115.4 |
| 5,404,970 | 4/1995 | Fuchs et al. | 188/1.11 |
| 5,407,033 | 4/1995 | Weiler et al. | 188/72.6 |
| 5,407,256 | 4/1995 | Saalbach et al. | 303/22.8 |
| 5,407,258 | 4/1995 | Giers et al. | 303/100 |
| 5,409,260 | 4/1995 | Reuber et al. | 280/753 |
| 5,411,324 | 5/1995 | Zydek et al. | 303/92 |
| 5,411,326 | 5/1995 | Linhoff | 303/116.2 |
| 5,412,170 | 5/1995 | Hofmann et al. | 200/536 |
| 5,415,468 | 5/1995 | Latarnik et al. | 303/100 |
| 5,417,484 | 5/1995 | Reinartz et al. | 303/116.1 |
| 5,417,485 | 5/1995 | Burgdorf et al. | 303/119.1 |
| 5,421,055 | 6/1995 | Harmon et al. | 15/250 |
| 5,421,643 | 6/1995 | Kircher | 303/3 |
| 5,427,213 | 6/1995 | Weiler et al. | 188/250 |
| 5,429,425 | 7/1995 | Drott | 303/3 |
| 5,433,512 | 7/1995 | Aoki et al. | 188/156 |
| 5,441,317 | 8/1995 | Gruden et al. | 292/336.3 |
| 5,443,097 | 8/1995 | Pfeiffer | 138/89 |
| 5,443,133 | 8/1995 | Dreilich et al. | 188/250 |
| 5,443,141 | 8/1995 | Thiel et al. | 188/71.9 |
| 5,443,309 | 8/1995 | Beck | 303/119.2 |
| 5,449,225 | 9/1995 | Burgdorf et al. | 303/113.1 |
| 5,451,867 | 9/1995 | Loreck et al. | 324/166 |
| 5,452,644 | 9/1995 | Bauer et al. | 91/376 |
| 5,453,676 | 9/1995 | Agrotis et al. | 318/643 |
| 5,454,632 | 10/1995 | Burgdorf et al. | 303/115.4 |
| 5,458,344 | 10/1995 | Weiler et al. | 277/212 |
| 5,458,404 | 10/1995 | Fennel et al. | 303/176 |
| 5,460,074 | 10/1995 | Balz et al. | 91/369.1 |
| 5,460,436 | 10/1995 | Volz et al. | 303/113.2 |
| 5,464,077 | 11/1995 | Thiel et al. | 188/72.5 |
| 5,464,079 | 11/1995 | Lohberg et al. | 188/315 |
| 5,465,631 | 11/1995 | Klinar | 74/458 |
| 5,465,636 | 11/1995 | Jones et al. | 74/602 |
| 5,469,757 | 11/1995 | Buhl et al. | 74/526 |
| 5,469,892 | 11/1995 | Noone et al. | 138/121 |
| 5,472,068 | 12/1995 | Weiler et al. | 188/73.44 |
| 5,472,070 | 12/1995 | Feigel | 188/299 |
| 5,472,264 | 12/1995 | Klein et al. | 303/3 |
| 5,472,266 | 12/1995 | Volz et al. | 303/116.1 |
| 5,473,896 | 12/1995 | Bergelin et al. | 60/589 |
| 5,473,958 | 12/1995 | Jeck et al. | 74/89.15 |
| 5,474,106 | 12/1995 | Burgdorf et al. | 137/495 |
| 5,474,121 | 12/1995 | Bryson et al. | 165/41 |
| 5,476,311 | 12/1995 | Fennel et al. | 303/122 |
| 5,476,313 | 12/1995 | Lauer | 303/119 |
| 5,477,456 | 12/1995 | Fennel et al. | 364/426.02 |
| 5,480,221 | 1/1996 | Morita et al. | 303/113.5 |
| 5,482,361 | 1/1996 | Burckhardt et al. | 303/113.5 |
| 5,484,194 | 1/1996 | Reinartz et al. | 303/116.2 |
| 5,485,899 | 1/1996 | Thiel et al. | 188/73.1 |
| 5,486,040 | 1/1996 | Beck et al. | 303/113.2 |
| 5,487,455 | 1/1996 | Feigel | 188/299 |
| 5,493,190 | 2/1996 | Mueller | 318/443 |
| 5,494,140 | 2/1996 | Weiler et al. | 188/73.38 |
| 5,494,344 | 2/1996 | Heyn et al. | 303/140 |
| 5,495,134 | 2/1996 | Rosenblum | 310/239 |
| 5,499,865 | 3/1996 | Katagiri et al. | 303/115.2 |

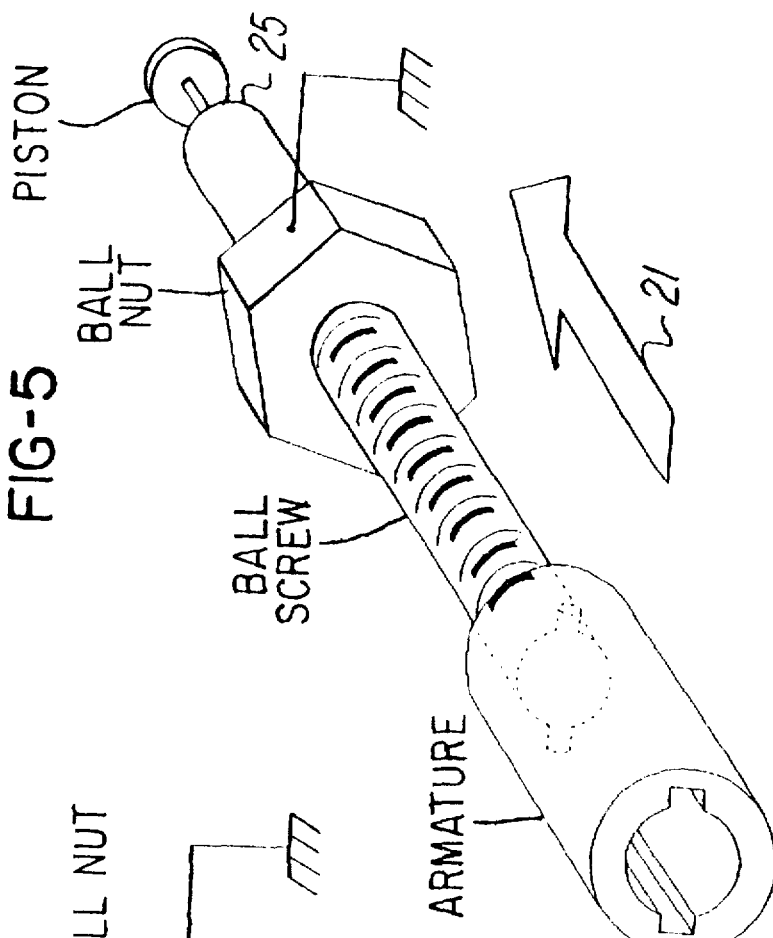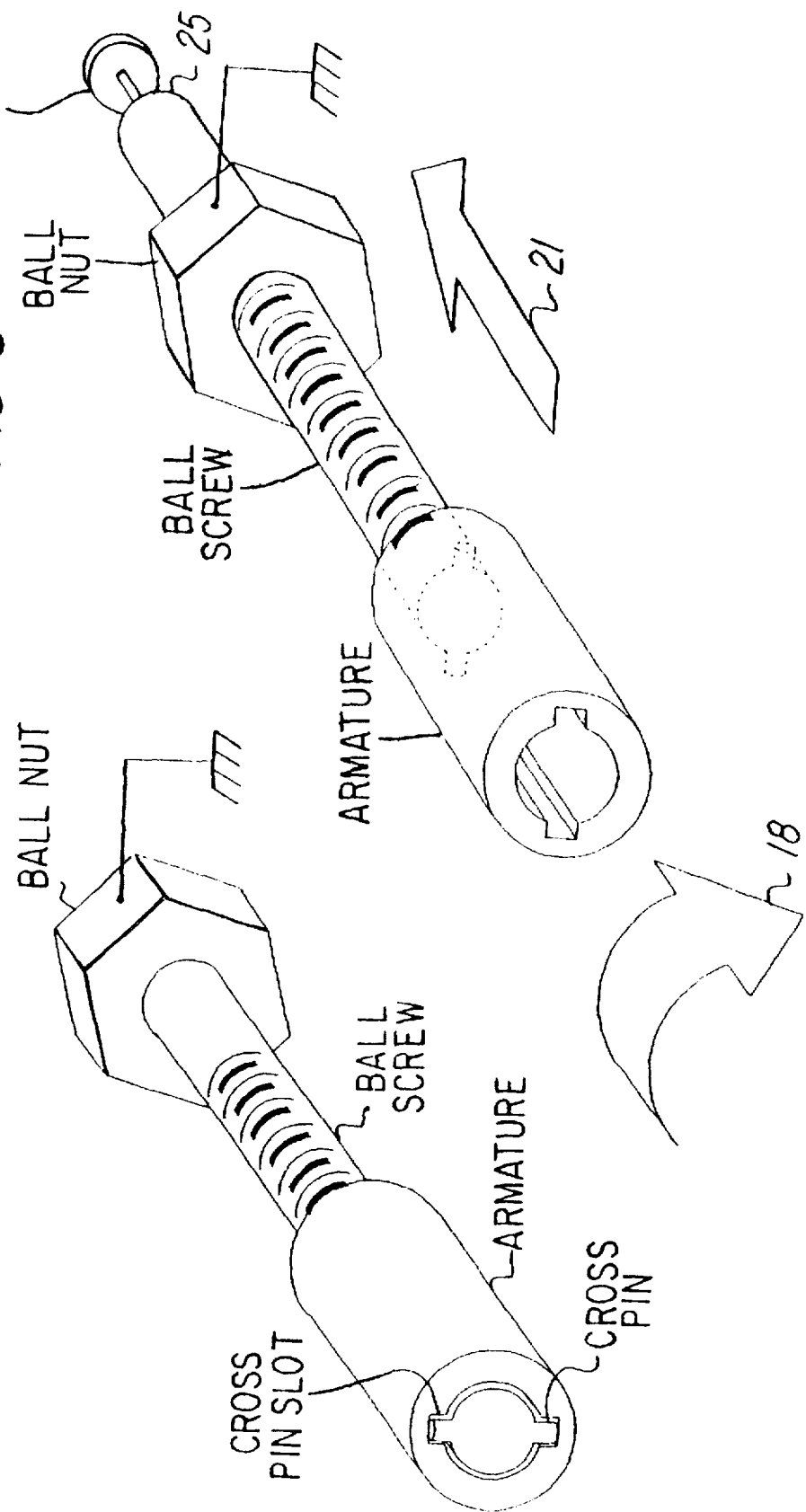

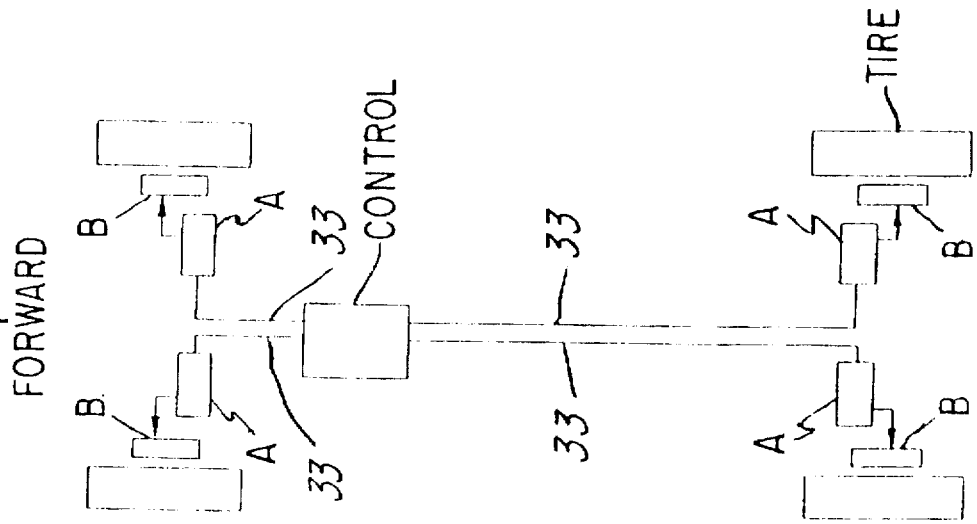
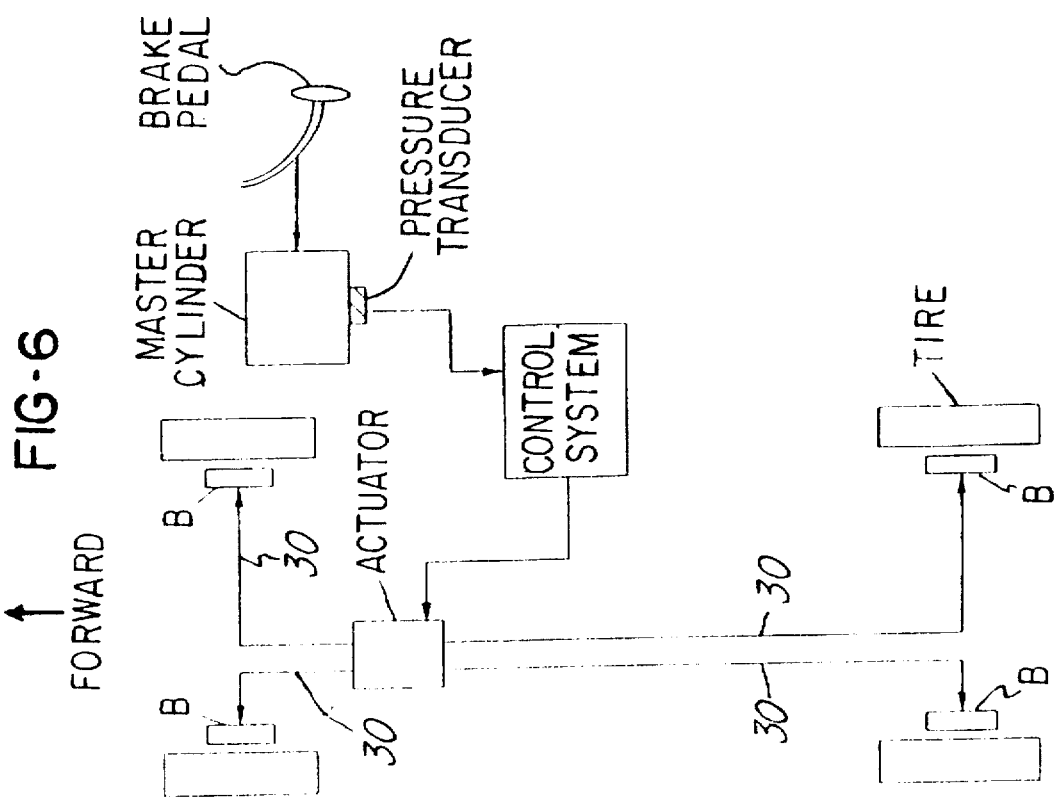

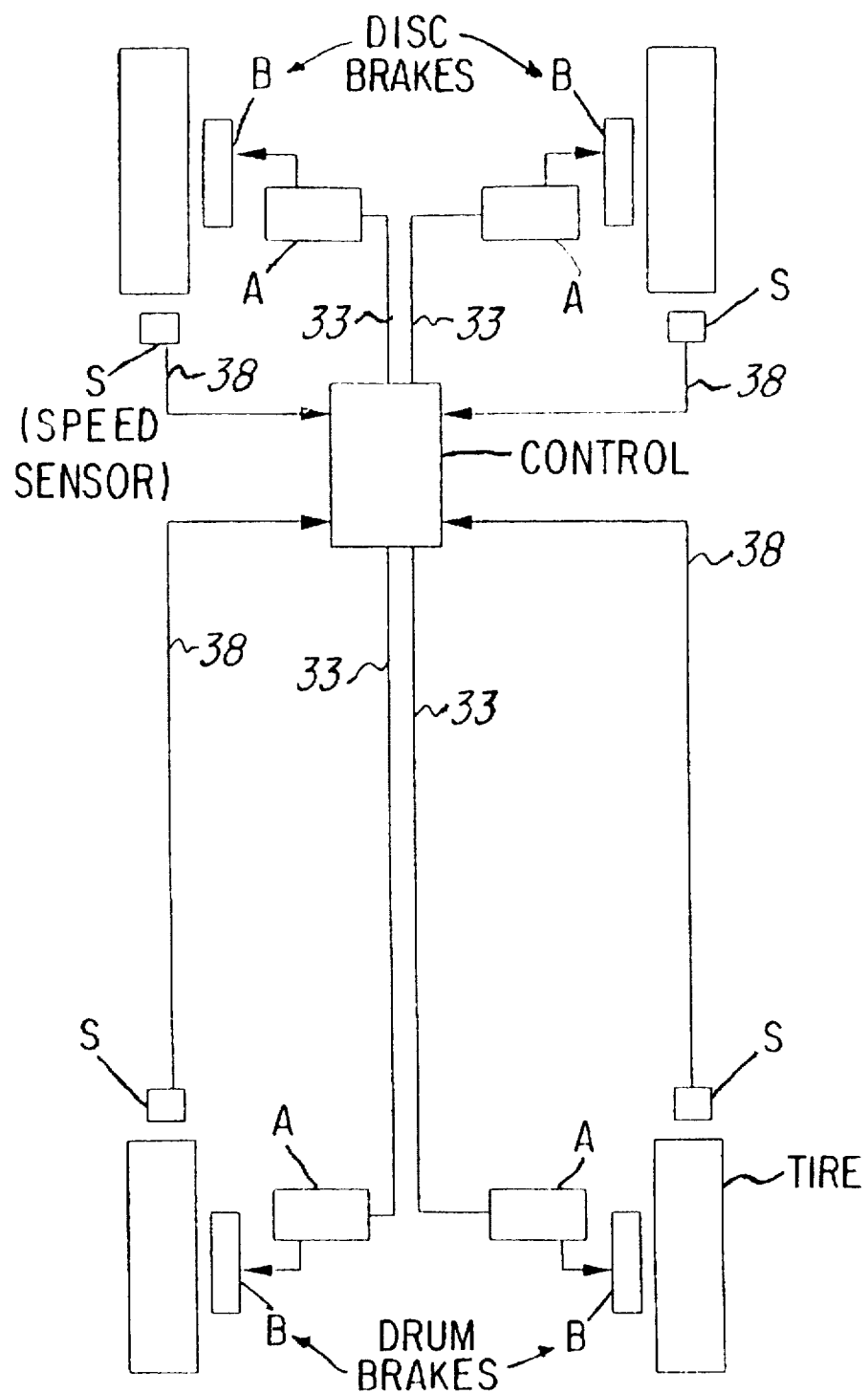

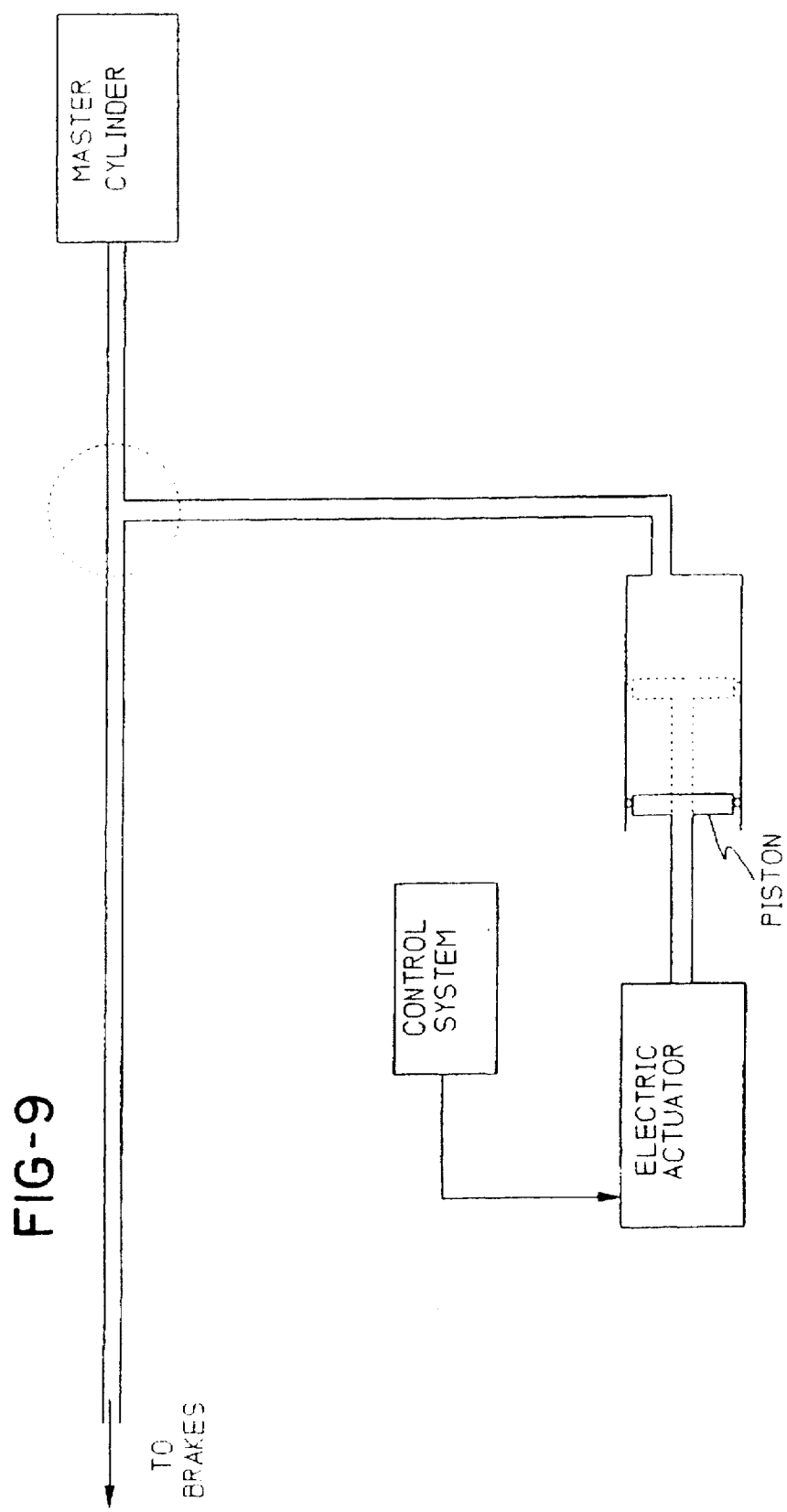

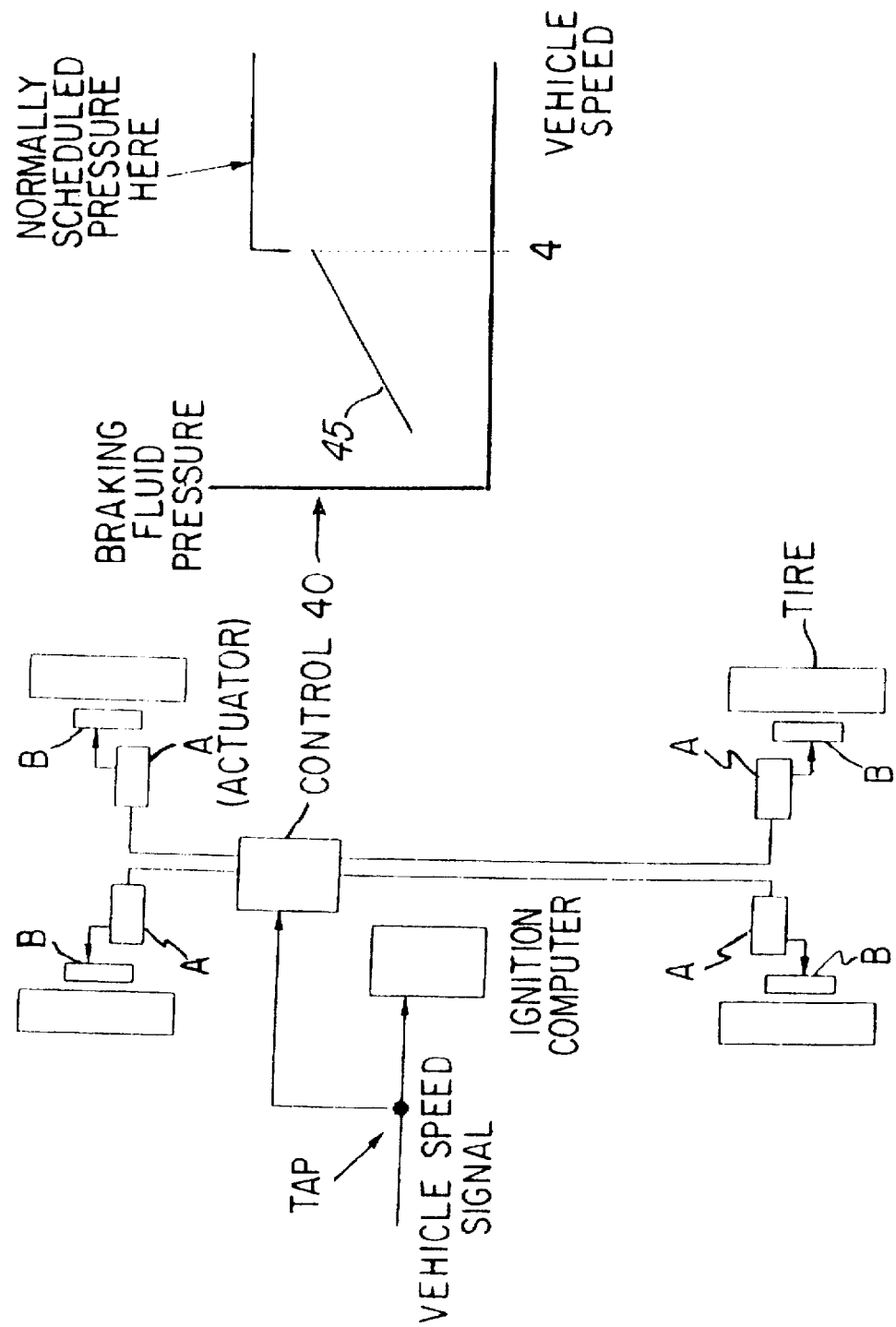

VEHICLE BRAKE

The invention concerns brakes for vehicles. In particular, the invention concerns electrically actuated brakes, which pressurize a hydraulic fluid, using electrical energy. Electric actuation provides direct compatibility with electronic control systems, and allows retro-fitting to existing hydraulic brake systems.

BACKGROUND OF THE INVENTION

For present purposes, a braking system in a vehicle can, conceptually, be reduced to the following components:

A brake pad (or shoe) which engages, and applies drag to, a brake rotor (or drum).

An actuator (such as the brake cylinder/piston located at each wheel) for the brake pad (or shoe).

A control system which triggers the actuator.

Commonly, the control system responds to a foot pedal which is depressed by the driver, and causes pressurized hydraulic fluid to be delivered to the actuator. (A vacuum-assisted booster commonly amplifies the pressure generated by the driver.) In a simplified sense, the braking system can be viewed as a amplification-and-delivery system for hydraulic signals.

It is possible to use other types of signals, such as electrical signals, to control the actuators. One advantage of electrical signals is that the modern microprocessor provides enormous computing power for processing, and delivering, electrical signals. Inexpensive microprocessors available in the early 1990's can process individual program instructions at the rate of a few microseconds per instruction. (One microsecond equals one millionth of a second.) These processors can easily run at clock rates of 5 MegaHertz, thereby providing an overall computation rate in the range of millions of instructions per second.

The invention concerns the application of electronic control techniques to vehicle braking systems.

OBJECTS OF THE INVENTION

An object of the invention is to provide an improved vehicle braking system.

A further object of the invention is to provide a vehicle braking system which can be controlled electronically.

A further object of the invention is to provide a vehicle braking system which can be coordinated with the on-board ignition computer of a vehicle.

A further object of the invention is to provide improved traction control in a vehicle braking system.

A further object of the invention is to provide an improved anti-lock braking system.

A further object of the invention is to provide a braking system which influences attitude control of a vehicle.

SUMMARY OF THE INVENTION

In one form of the invention, an electrically powered actuator generates pressure which is applied to brake cylinders. The actuator is controlled by an electronic control system. The control system can apply different, programmed, braking pressure to individual wheels.

BRIEF DESCRIPTION OF THE DRAWINGS

FIGS. 3, 4 and 5 illustrate, in schematic form, operation of the apparatus of FIG. 2.

FIGS. 6, 7 and 8 are overhead views of four tires of a vehicle, and illustrate different embodiments of the invention.

FIG. 9 illustrates how the invention can be spliced into a hydraulic brake system.

FIG. 10 illustrates a control system for reducing brake pressure during stops.

DETAILED DESCRIPTION OF THE INVENTION

Actuator

Figure 1:
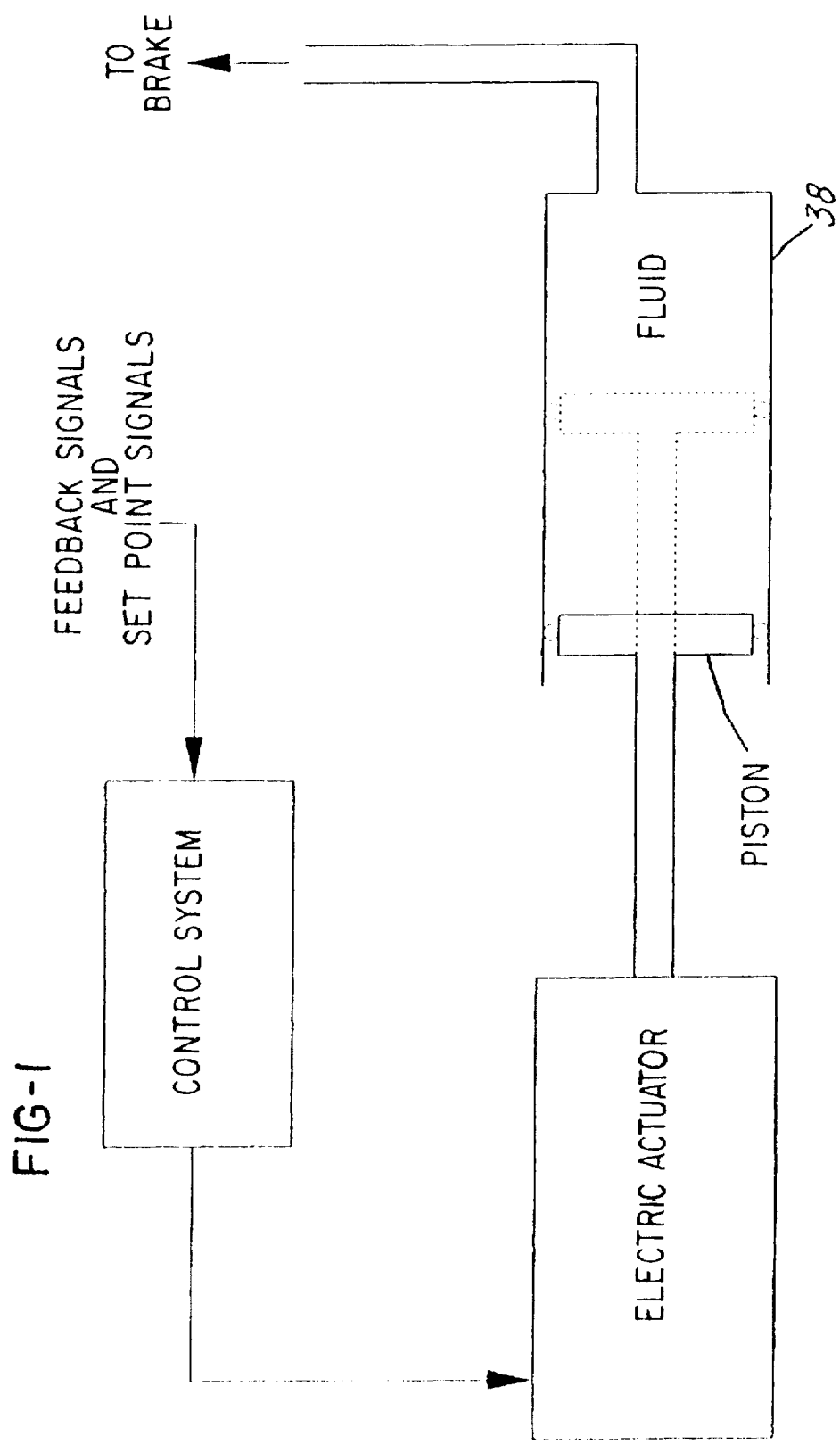
FIG. 1 is one view of the invention.

FIG. 1 is a schematic of one form of the invention. A CONTROL SYSTEM delivers a signal to an ELECTRICAL ACTUATOR, which drives a PISTON, which pressurizes a FLUID, which leads to a BRAKE, as indicated. The CONTROL is SYSTEM receives various signals which it uses in its processing, as indicated.

Figure 2:
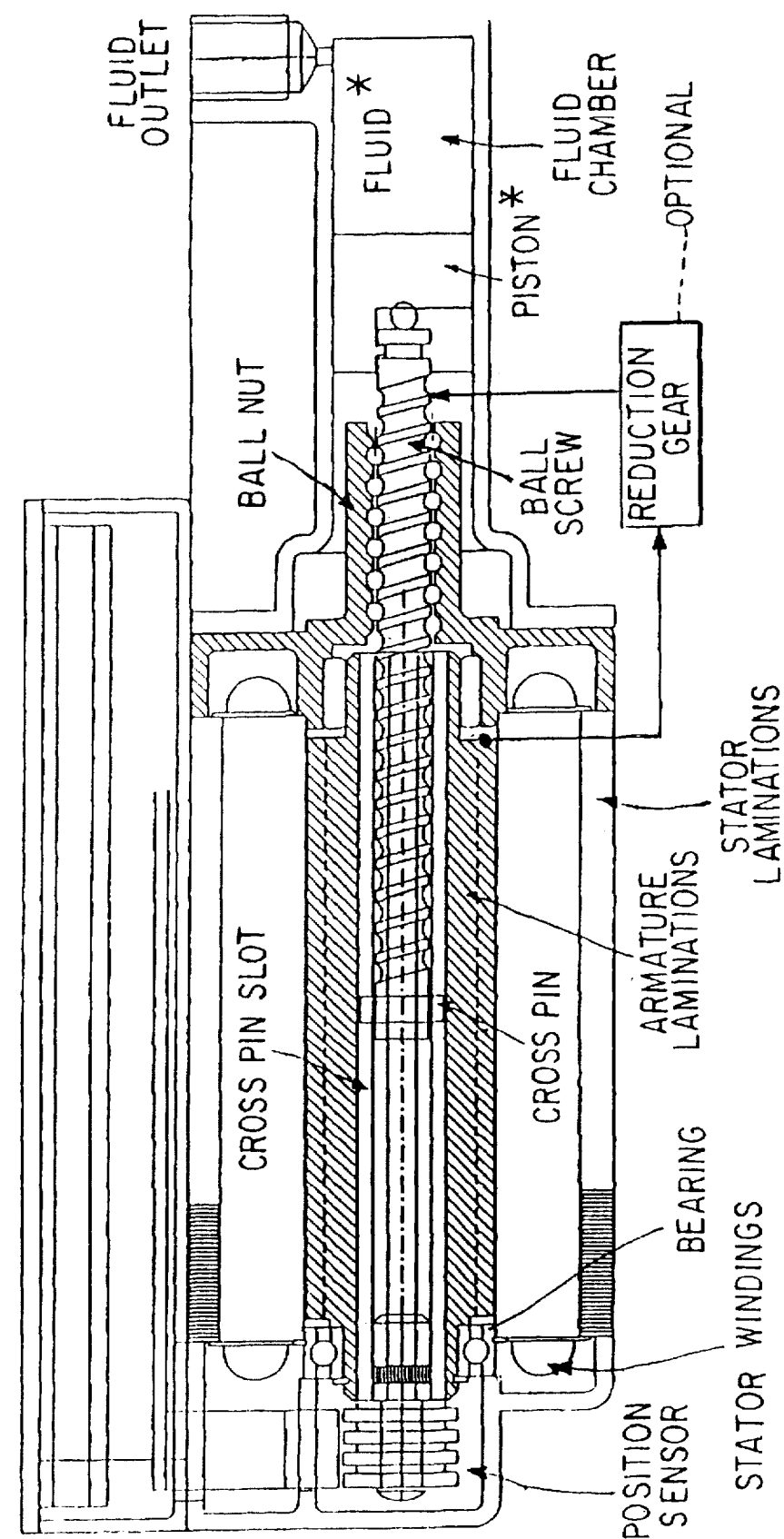
FIG. 2 is a detailed view of form of the invention, showing a device which provides a pump function.

FIG. 2 illustrates one particular embodiment of the actuation system. Three components, labeled with asterisks (*), correspond to similar components in FIG. 1. These are: ELECTRIC ACTUATOR, PISTON, and FLUID.

Figure 3:
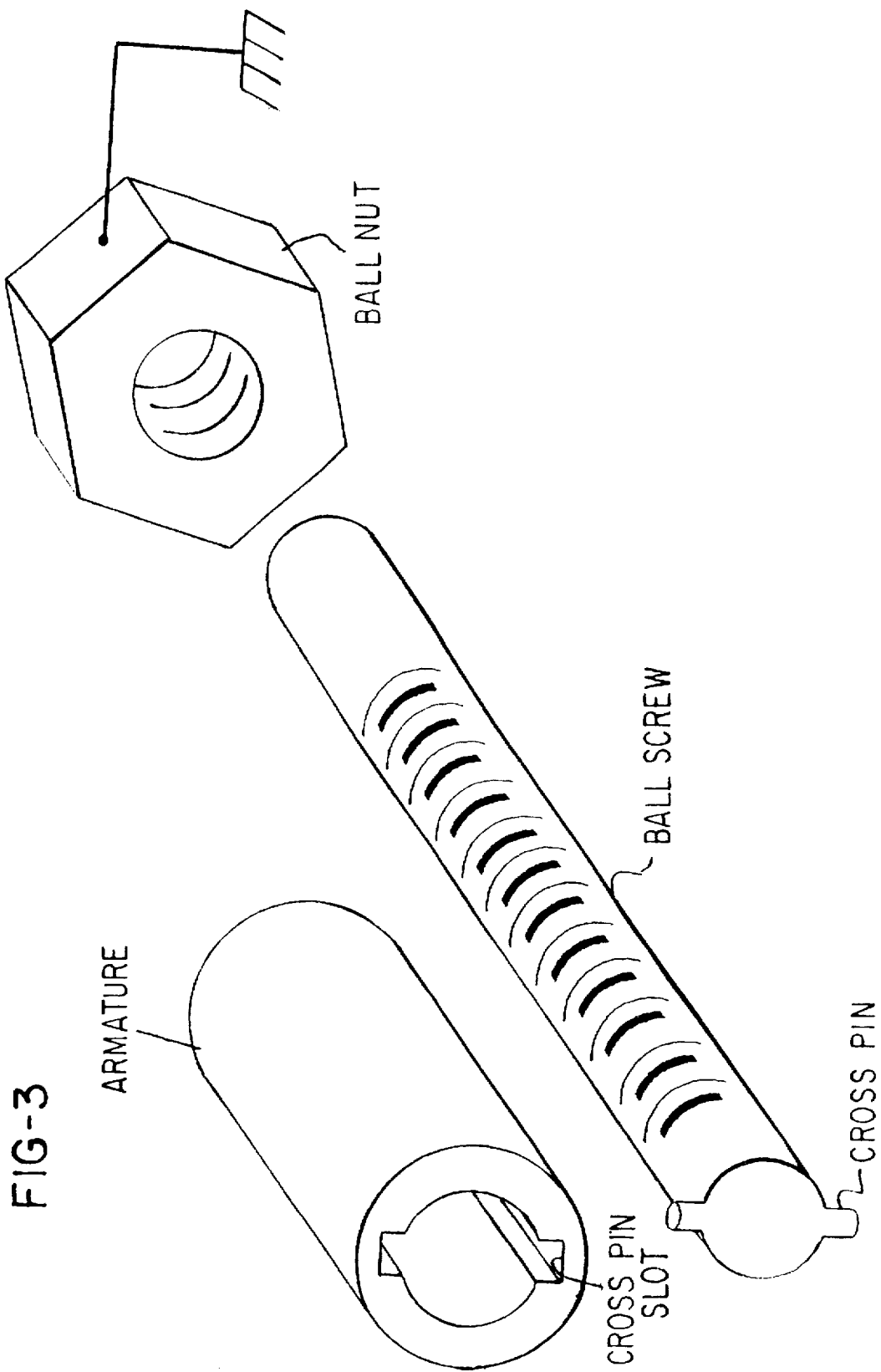

FIGS. 3, 4, and 5 are highly simplified schematics which illustrate some of the principles of operation of the device of FIG. 2.

FIG. 3 is an exploded, schematic view of selected parts of FIG. 2. Of these, the BALL NUT is restrained against both rotation and lateral motion, as indicated by the ground symbol.

FIG. 4 illustrates these parts when assembled. The CROSS PIN carried by the BALL SCREW engages the CROSS PIN SLOT, which is broached into the ARMATURE. This engagement forces the BALL SCREW to rotate synchronously with the ARMATURE.

As shown in FIG. 5, when the ARMATURE is rotated, as indicated by arrow 18, the BALL SCREW advances in the direction of arrow 21, because it threads through the stationary BALL NUT. A PISTON, also shown in FIG. 2, which is linked to the end 25 of the BALL SCREW, compresses fluid (not shown in FIG. 5). The fluid actuates a brake, as in FIG. 1.

Applications of Actuator

One Application

The ACTUATOR shown in FIG. 2 can be used to generate pressure which is applied to brake shoes or pads. In FIG. 6, the ACTUATOR delivers pressurized hydraulic fluid to the brakes B through brake lines 30. This actuation is induced by motion of a brake PEDAL, which generates pressure in a master cylinder, known in the art. The master cylinder is instrumented to detect the pressure. A CONTROL SYSTEM uses this pressure to infer the amount of braking force requested by the driver, and causes the ACTUATOR to apply appropriate pressure to lines 30. In the event of system malfunction, the brakes revert to obtaining actuation pressure from the master cylinder.

Variations in pressure generated by the ACTUATOR may be desired. How to cause variation is discussed later in this Specification.

Second Application

Another application is shown in FIG. 7. Individual actuators A, each of the type shown in FIG. 2, deliver fluid to their own respective brakes B. Each actuator A is controlled individually by a CONTROL, through electrical signal lines 33. In this embodiment, each brake B can be controlled individually. This individual control can be useful if the vehicle is equipped with an anti-lock braking system (ABS). The actuators described herein can be used to provide the ABS function.

In an anti-lock braking system, wheel speed is sensed, and braking pressure is adjusted, in order to prevent wheel speed from dropping to zero. When wheel speed is sensed to approach zero, some anti-lock braking systems initiate a response by overpowering the brakes applied by the driver, and forcing brake pressure to subside. That is, a second hydraulic system, in addition to the normal brake hydraulic system, overrides the normal braking action.

The embodiment of FIG. 7 allows each brake to be individually relaxed, when the ABS detects that a wheel is about to lock. A hydraulic system which overrides the normal braking system is not required. (Neither an ABS, nor connection between an ABS and the CONTROL, is shown.) This ABS emulation is explained in connection with FIG. 8.

In FIG. 8, a speed sensor S detects speed of each TIRE. The sensors S deliver the speeds to a CONTROL along lines 38. When a given speed is detected as approaching zero, the CONTROL performs an anti-locking function, by relaxing the braking pressure applied to that wheel, thereby de-actuating (or reducing pressure applied by) the proper actuator A.

Use as Parking Brake

The actuator of FIG. 2 can be used as an electrically energized parking brake. One approach is shown in FIG. 9. The ACTUATOR is spliced into a brake line, as indicated by the dashed circle C. The ACTUATOR applies pressure to the brake line, thereby braking the wheels while the vehicle is parked, and unattended.

In order to eliminate the requirement that electrical current be continually applied to the ACTUATOR, a mechanical detent can be installed for locking the PISTON, as known in the art.

Alternate Embodiment

Figure 11:
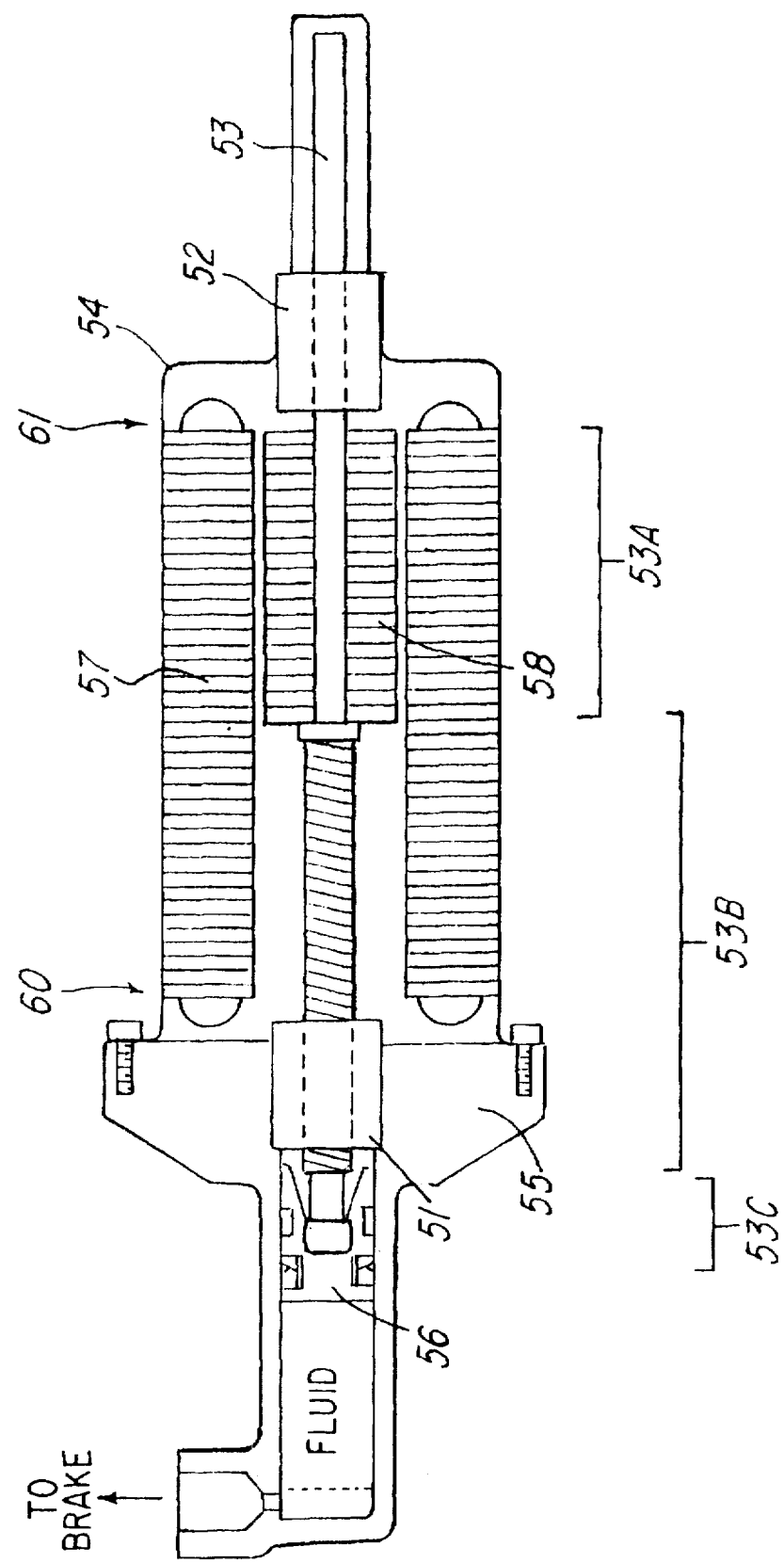
FIG. 11 illustrates another form of the invention.

FIG. 11 illustrates another embodiment of the invention. Several features of FIG. 11 are the following.

A ball nut 51 is fixed to a housing 55, and does not rotate with respect to the housing 55. A ball nut bushing, or ball nut hybrid, 52 is affixed to the motor casing 54, to facilitate helical motion.

An armature shaft 53 comprises (a) a section 53A which carries a lamination stack 58, (b) a ball screw section 53B, and (c) a section 53C for connecting to a piston 56.

A stator unit 57 comprises windings of an S-R, or brushless PM motor. A lamination stack 58 is used for an S-R motor, or magnets for brushless PM motor.

An important distinction between the actuator of is FIG. 11 and that of FIG. 2 is that, in FIG. 11, the lamination stack 58 which forms the armature translates leftand rightward, as the shaft 53 rotates. That is, the lamination stack 58 shuttles left and right between points 60 and 61.

In contrast, in FIG. 2, the ARMATURE LAMINATION/BALL NUT assembly does not translate. The BALL SCREW performs the translation, and shuttles left and right through the ARMATURE LAMINATIONS, which are stationary (but rotating).

Additional Considerations

1. The motor shown in FIG. 2 can take the form of an alternating current (AC) motor. AC current can be derived from the battery of the vehicle (which produces DC current) by an inventor, or equivalent device. AC power has the advantage of allowing simple speed control, by pulse-width modulation (PWM).

However, AC motors are not required, and DC motors can be used. The particular type of motor is not necessarily significant, but several characteristics are desirable. One is that a high free speed is necessary, in order to provide good response. A second is a suitably high ratio of stall torque/armature inertia.

Additionally, a low-inertia armature is preferred, for short response time. A laminated armature stack (as opposed to a copper-wire-wound armature) provides low inertia.

Further, if a high-speed, low torque motor is used, then a reduction gear, indicated as optional in FIG. 2, can be interposed in the drive train between the ARMATURE and the BALL SCREW.

2. A POSITION SENSOR in FIG. 2 detects the position of the PISTON. The POSITION SENSOR produces an electrical signal which is usable by the CONTROL shown in FIG. 7. Position detection can be necessary to limit the travel of the PISTON. For example, when the PISTON in FIG. 1 is being driven rightward, the POSITION SENSOR (not shown in FIG. 1) continually detects the position.

3. The torque produced by electric motors, in general, depends on the current drawn. In some types of motor, the rotor current is especially sensitive to motor torque. Therefore, motor current both indicates and determines motor torque, which indicates pressure of the FLUID in FIG. 2. This fact can be utilized as follows.

Many vehicles employ a combination of disc- and drum-type brakes. Commonly, disc-type brakes are used on the forward wheels, while drum-type brakes are used on the rear wheels. One reason is that the forward brakes absorb most of the braking force during a stop, and thus must dissipate larger amounts of energy than the rear brakes. Disc-type brakes are suited to large energy absorption, because of their higher ability to dissipate heat, as compared with drum-type brakes.

However, for a given brake pad pressure, drum brakes provide greater braking force than disc brakes, partly because drum brakes are self-energizing. (The brake pad rotates into contact with the drum. When contact is made, friction drags the pad into slightly greater rotation, which applies greater pressure to the drum, thereby increasing braking drag.)

Therefore, because of the different braking forces obtained from disc and drum brakes, it is common to provide a pressure proportioning valve for allocating different pressures to each. During a stop, greater fluid pressure is directed to the forward disc brakes than to the rear drum brakes.

However, the proportioning valve does not provide optimum pressure allocation under all braking conditions. For example, during a light stop, the proportioning valve may provide proper allocation of pressure. But during a heavy stop, the pressure applied to the rear brakes may cause the rear wheels to lock.

The invention, as shown in FIGS. 7 and 8, allows pressure proportioning which can be controlled by an algorithm, which runs within the CONTROL. A very simple algorithm is the following.

During light braking (indicated by light pressure produced by the PRESSURE TRANSDUCER in FIG. 6), one pressure is applied to the forward brakes, and a different pressure is applied to the rear brakes.

The different pressures are obtained by applying different currents to the forward actuators A, as compared with the rear actuators A.

In contrast, during heavy braking, greater pressure is applied to both the forward brakes and to the rear brakes than applied previously. However, the ratio of (forward pressure)/(rear pressure) during heavy braking is, in general, different than the same ratio during light braking. (This ratio refers to the pressures developed within the FLUIDs of the respective actuators. It can be related to the pressures applied by the brake pads to their respective discs or drums.)

In practice, a more complex algorithm will certainly be used, but will embody this basic principle.

4. During braking, many drivers ease up on pedal pressure as the vehicle approaches zero speed, in order to achieve a smooth, gentle stop, wherein the nose of the vehicle does not dip and then jump upward. The invention can automate this function.

For example, in many vehicles, as shown in FIG. 10, a signal indicative of vehicle speed is fed to the on-board IGNITION COMPUTER. A CONTROL 40 taps this signal. During braking, when vehicle speed drops to a predetermined value, such as 4 miles per hour, the control 40 intervenes, and diminishes fluid pressure fed to the brakes, as by ramping the pressure down, as indicated generally by plot 45. This reduction in pressure can be obtained by reducing motor current, as discussed above.

Thus, a gradually lessening brake force is applied to the brakes during stops, without driver involvement.

5. The invention is not limited to use in self-powered vehicles. It can be used in trailers.

6. Pressure of the FLUID shown in FIGS. 1 and 2 need not be inferred from the current drawn by the motor. Other parameters can be used to infer pressure. It can be inferred from piston position. It can be measured directly, as by using a transducer in communication with the FLUID.

7. One feature of the invention is that it measures pressure in the vehicle's master cylinder and, based on the measured pressure, modulates pressure generated by an electrically-energized actuator (such as that shown in FIG. 2), and applies the latter pressure to the vehicle brakes.

Numerous modifications and substitutions can be undertaken without departing from the true spirit and scope of the invention. What is desired to be secured by Letters Patent is the invention as defined in the following claims.

We claim:

1. A braking system for a vehicle, comprising:
    a) hydraulically actuated brakes located at wheels; and
    b) for each hydraulically actuated brake, a hydraulic actuator which is electrically actuated;
    said hydraulic actuator comprising a fixed stator and an armature having a piston secured thereto a fixed distance therefrom and situated in a fixed stator, said armature having a screw coupled thereto and threadably engaging a non-rotating nut such that said armature rotates when said stator is electronically energized to drive said screw relative to said fixed stator in order to axially drive said piston and said armature, said piston and said armature remaining said fixed distance apart.

2. A system according to claim 1, and further comprising:
    c) a control for actuating each hydraulic actuator.

3. A system according to claim 2, in which each hydraulic actuator can be actuated independently of the others.

4. The braking system as recited in claim 1 wherein said fixed stator comprises a plurality of laminations having a first length and said rotor comprises a plurality of laminations comprising a second length, said second length being shorter than said first length to permit said rotor to rotate and slide within said fixed stator to drive said screw.

5. The braking system as recited in claim 1 wherein said armature comprises a cross-pin slot, said screw comprising a cross-pin received in said cross-pin slot such that when said armature rotates, said cross-pin moves in said cross-pin slot to hydraulically actuate at least one of said hydraulically actuated brakes.

6. A system for providing a parking brake function for a vehicle, comprising:
    a) an electrically actuated hydraulic actuator; and
    b) means for delivering hydraulic pressure generated by the electrically actuated hydraulic actuator to a hydraulic brake on the vehicle;
    said electrically actuated hydraulic actuator comprising a fixed stator and an armature having a piston secured thereto a fixed distance from said armature situated therein, said armature having a screw coupled thereto and threadably engaging a nonrotating nut such that said armature rotates when said fixed stator is electronically energized to rotatably drive said armature and axially drive said screw relative to said fixed stator in order to axially drive both said piston and said armature to actuate at least one of said hydraulically actuated brakes, said piston and said armature remaining said fixed distance apart during said axial movement.

7. The system as recited in claim 6 wherein said fixed stator comprises a plurality of laminations having a first length and said rotor comprises a plurality of laminations comprising a second length, said second length being shorter than said first length to permit said rotor to rotate and slide within said fixed stator in order to drive said screw.

8. The system as recited in claim 6 wherein said armature comprises a cross-pin slot, said screw comprising a cross-pin received in said cross-pin slot such that when said armature rotates, said cross-pin moves in said cross-pin slot to hydraulically actuate at least one of said hydraulically actuated brakes.

9. The system as recited in claim 6 wherein said fixed stator comprises a plurality of laminations having a first length and said rotor comprises a plurality of laminations comprising a second length, said second length being shorter than said first length to permit said rotor to rotate and slide within said fixed stator to drive said screw.

10. In a brake for a vehicle, in which hydraulic pressure is applied to a brake pad, the improvement comprising:
    a) an electric motor;
    b) a ballscrew driven by the motor;
    c) a ballscrew nut, which
        i) is fixed in position,
        ii) engages the ballscrew, and
        iii) causes the ballscrew to advance laterally when the ballscrew rotates; and
    d) a piston, contained within a cylinder which also contains hydraulic fluid, which
        i) is driven by the ballscrew, and
        ii) causes the hydraulic fluid to become pressurized when the ballscrew advances;
    wherein said electric motor comprises a fixed stator and an armature having said ballscrew coupled thereto and threadably engaging said ballscrew nut such that when said fixed stator is electronically energized, said armature and ballscrew rotate to axially drive both said armature and said piston to pressurize said hydraulic fluid; said ballscrew engaging said piston a fixed distance apart therefrom.

11. Apparatus according to claim 10, and further comprising:

e) a position sensor for detecting position of the ballscrew.

12. Apparatus according to claim 11, and further comprising:

e) a reduction gear interconnected between the motor and the ballscrew, for increasing motor torque applied to the ballscrew.

13. The improvement as recited in claim 10 wherein said fixed stator comprises a plurality of laminations having a first length and said rotor comprises a plurality of laminations comprising a second length, said second length being shorter than said first length to permit said rotor to rotate and slide within said fixed stator to drive said screw.

14. The improvement as recited in claim 10 wherein said armature comprises a cross-pin slot, said screw comprising a cross-pin received in said cross-pin slot such that when said armature rotates, said cross-pin moves in said cross-pin slot to hydraulically actuate at least one of said hydraulically actuated brakes.

15. A method of operating brakes in a vehicle, comprising the following steps:

a) providing a driver comprising a fixed stator, an armature having a screw and a piston;

b) threadably engaging said screw in a non-rotating nut such that said armature rotates when said fixed stator is electronically energized to simultaneously drive said armature, said piston and said screw to generate pressure in a master brake cylinder;

c) establishing a fixed distance between the piston and armature;

d) maintaining said fixed distance during axial movement of the piston and armature;

e) deriving a signal which indicates said pressure; and f) using said signal to control one or more electrically powered actuators, which apply hydraulic fluid to the brakes.

16. The method according to claim 15, in which each said electrically powered actuator modulates pressure applied to the hydraulic fluid, in response to changes in the signal.

17. The method as recited in claim 15 wherein said fixed stator comprises a first plurality of laminations having a first length and said rotor comprises a second plurality of laminations comprising a second length, said second length being shorter than said first length; said method further comprising the step of:

energizing said first and second laminations to cause said rotor to rotatably drive said screw.

18. The method as recited in claim 15 wherein said armature comprises a cross-pin slot, said screw comprising a cross-pin received in said cross-pin slot such that when said armature rotates, said screw moves in said cross-pin slot, said method further comprising the step of:

energizing said fixed stator and said armature to rotate said rotor and said screw such that said screw moves in said cross-pin slot in order to hydraulically actuate at least one of said hydraulically actuated brakes.

* * * * *